US010402885B2

(12) United States Patent
Sundaresan et al.

(10) Patent No.: US 10,402,885 B2
(45) Date of Patent: Sep. 3, 2019

(54) SEARCHABLE TEXTURE INDEX (71) Applicant: eBay Inc., San Jose, CA (US)

(72) Inventors: Neelakantan Sundaresan, Mountain View, CA (US); Anurag Bhardwaj, Sunnyvale, CA (US); Robinson Piramuthu, Oakland, CA (US)

(73) Assignee: eBay Inc., San Jose, CA (US)

(*) Notice: Subject to any disclaimer, the term of this patent is extended or adjusted under 35 U.S.C. 154(b) by 220 days.

(21) Appl. No.: 15/609,930

(22) Filed: May 31, 2017

(65) Prior Publication Data
US 2017/0262919 A1 Sep. 14, 2017

Related U.S. Application Data (63) Continuation of application No. 13/863,191, filed on Apr. 15, 2013, now Pat. No. 9,672,553.

(51) Int. Cl.
G06Q 30/00 (2012.01)
G06Q 30/06 (2012.01)
G06F 3/01 (2006.01)

(52) U.S. Cl.
CPC ......... *G06Q 30/0627* (2013.01); *G06F 3/016* (2013.01)

(58) Field of Classification Search
None
See application file for complete search history.

(56) References Cited

U.S. PATENT DOCUMENTS

| 8,886,576 | B1 | 11/2014 | Sanketi et al. |
| 9,672,553 | B2 | 6/2017 | Sundaresan et al. |
| 2010/0231541 | A1 | 9/2010 | Cruz-hernandez et al. |
| 2011/0157088 | A1 | 6/2011 | Motomura et al. |
| 2013/0009892 | A1 | 1/2013 | Salmela |
| 2013/0113715 | A1 | 5/2013 | Grant et al. |
| 2013/0127735 | A1* | 5/2013 | Motoyama ............. G06F 3/041 345/173 |
| 2013/0181913 | A1 | 7/2013 | Cole et al. |
| 2013/0198625 | A1 | 8/2013 | Anderson et al. |
| 2014/0139450 | A1 | 5/2014 | Levesque et al. |
| 2014/0280049 | A1* | 9/2014 | Penha ................. G06F 16/9032 707/722 |
| 2014/0310131 | A1 | 10/2014 | Sundaresan et al. |

OTHER PUBLICATIONS

"U.S. Appl. No. 13/863,191, Examiner Interview Summary dated Jun. 1, 2015", 3 pgs.
"U.S. Appl. No. 13/863,191, Examiner Interview Summary dated Sep. 16, 2016", 3 pgs.
"U.S. Appl. No. 13/863,191, Examiner Interview Summary dated Nov. 8, 2016", 3 pgs.

(Continued)

*Primary Examiner* — Mila Airapetian
(74) *Attorney, Agent, or Firm* — SBMC (57) ABSTRACT Electronic content that has a tactile dimension when presented on a tactile-enabled computing device may be referred to as tactile-enabled content. A tactile-enabled device is a device that is capable of presenting tactile-enabled content in a manner that permits a user to experience tactile quality of electronic content. In one example embodiment, a system is provided for generating content that has a tactile dimension when presented on a tactile-enabled device.

20 Claims, 4 Drawing Sheets (56) References Cited

OTHER PUBLICATIONS

"U.S. Appl. No. 13/863,191, Final Office Action dated Feb. 24, 2015", 5 pgs.
"U.S. Appl. No. 13/863,191, Final Office Action dated Jun. 15, 2016", 12 pgs.
"U.S. Appl. No. 13/863,191, Non Final Office Action dated Jan. 6, 2016", 11 pgs.
"U.S. Appl. No. 13/863,191, Non Final Office Action dated Sep. 9, 2014", 12 pgs.
"U.S. Appl. No. 13/863,191, Non Final Office Action dated Sep. 22, 2016", 12 pgs.
"U.S. Appl. No. 13/863,191, Notice of Allowance dated Feb. 14, 2017", 9 pgs.
"U.S. Appl. No. 13/863,191, Response filed May 6, 2016 to Non Final Office Action dated Jan. 6, 2016", 12 pgs.
"U.S. Appl. No. 13/863,191, Response filed Jun. 24, 2015 to Final Office Action dated Feb. 24, 2015", 11 pgs.
"U.S. Appl. No. 13/863,191, Response filed Sep. 15, 2016 to Final Office Action dated Jun. 15, 2016", 22 pgs.
"U.S. Appl. No. 13/863,191, Response filed Dec. 9, 2014 to Non Final Office Action dated Sep. 9, 2014", 10 pgs.
"U.S. Appl. No. 13/863,191, Response Filed Dec. 22, 2016 to Non Final Office Action dated Sep. 22, 2016", 21 pgs.

\* cited by examiner

SEARCHABLE TEXTURE INDEX

PRIORITY

This application is a continuation of and claims the benefit of priority to U.S. patent application Ser. No. 13/863,191, entitled "SEARCHABLE TEXTURE INDEX," filed on Apr. 15, 2013, which is hereby incorporated by reference herein in its entirety.

TECHNICAL FIELD

This application relates to the technical fields of software and/or hardware technology and, in one example embodiment, to system and method for generating and using a searchable texture index.

BACKGROUND

An on-line trading platform allows users to search for items that may be of interest to them, using a web browser application. A user may find an item listed by an on-line trading application by entering keywords into the search box provided on an associated web page or by browsing through the list of categories on the home page of an on-line trading application. After a list of search results is returned, a user may click on a search result from the list to view the details of the associated item. The details may include a picture of the item, as well as the description that provides further details about the item.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Method and system for generating and using a searchable texture index are described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

As mentioned above, a user may search for items listed by an on-line trading application and examine each search result by expanding the search result list entry and viewing the details about the item, where the details may include a picture and a description of the item. In one example embodiment, an on-line trading application may include a so-called texture index and a system for generating content that has a tactile dimension when presented on a tactile-enabled device. Content that has a tactile dimension when presented on a tactile-enabled device may be referred to as tactile-enabled content. A tactile-enabled device is a device that is capable of presenting tactile-enabled content in a manner that permits a user to experience tactile quality of the content. In one example embodiment, a mobile device, such as a mobile phone or a tablet may be a tactile enabled device. There are multiple ways to enable tactile functions on portable devices such as smartphones. One example approach is to use vibratory feedback to mimic tactile functions. Another approach is to render a transparent and dynamic tactile surface that may be positioned on top of smartphone touch screens. When a user presses a button, the tactile functions in the surface get activated and the surface deforms to mimic tactile functions.

A texture index may include entries that can be used by a tactile-enabled device to present texture quality to a user in a manner that provides tactile experience. An entry in a texture index may be generated based on a textual description of a material (such as, e.g., "silk" or "leather") or, e.g., based on information obtained by a texture-recognition electronic device. A texture-recognition electronic device may be, e.g., a camera equipped with sensors that can, in addition to capturing an image or a video of an object, produce measurements of wrinkles, roughness, smoothness, sheen, shine etc. In one example embodiment, given an input image, an image recognition software program processes the image and extracts texture specific attributes such as material, roughness etc. This may be done purely using the pixel level data from the image using an annotated set of images with their texture attributes. Various image level texture attributes, such as textons, etc., can be used to conform the image to attribute mapping, using machine learning techniques.

In one example embodiment, a system for generating content that has a tactile dimension when presented on a tactile-enabled device may be used to create tactile-enabled content and/or to enhance existing content with a tactile dimension. For example, a listing of an item provided by an on-line trading platform may include a description or an attribute that is indicative of texture, such as "denim" or "leather." When such attribute or description is determined to be present in a listing, the system for generating content that has a tactile dimension may search a texture index based on the attribute that is indicative of texture, and, if the texture index contains an entry that corresponds to that attribute or description, include texture data from the determined entry into the listing. The resulting version of the listing is enhanced with texture information and can be suitable for being presented on a tactile-enabled device in a manner that provides a user with tactile experience.

Content that includes texture information and that is suitable for presentation on a tactile-enabled device in a manner that provides a user with a tactile experience may be referred to as a tactile-enabled content. It will be noted, that for the purposes of this description, the term content refers, generally, to electronic content. Tactile-enabled content may be a provided in the context of any service that includes representation of an object that has texture.

A system for generating content that has a tactile dimension when presented on a tactile-enabled device may be referred to as a tactile information system. In some embodiments, a tactile information system may be used to generate a searchable texture index and also to generate tactile-enabled content. In addition, a tactile information system may be used to create a searchable texture index and to facilitate searching for those listings provided by an on-line trading platform that describe items as having certain respective texture-related attributes. For example, when a user enters search terms related to texture, a search engine may be configured to use a texture index to generate search results of listings that have the texture features matching the search terms entered by the user. In one example embodiment, given a database of images, a software program is first used to extract texture attributes using image recognition techniques. Each database image may be indexed with such extracted attributes. When a particular user enters a search term containing a texture attribute, this particular index is looked up and all the images containing the queried attribute are returned as matches. This process may be performed using standard information retrieval techniques used in text-based searches. Method and system for generating content that has a tactile dimension when presented on a tactile-enabled device may be implemented in the context of a network environment 100 illustrated in FIG. 1.

Figure 1:
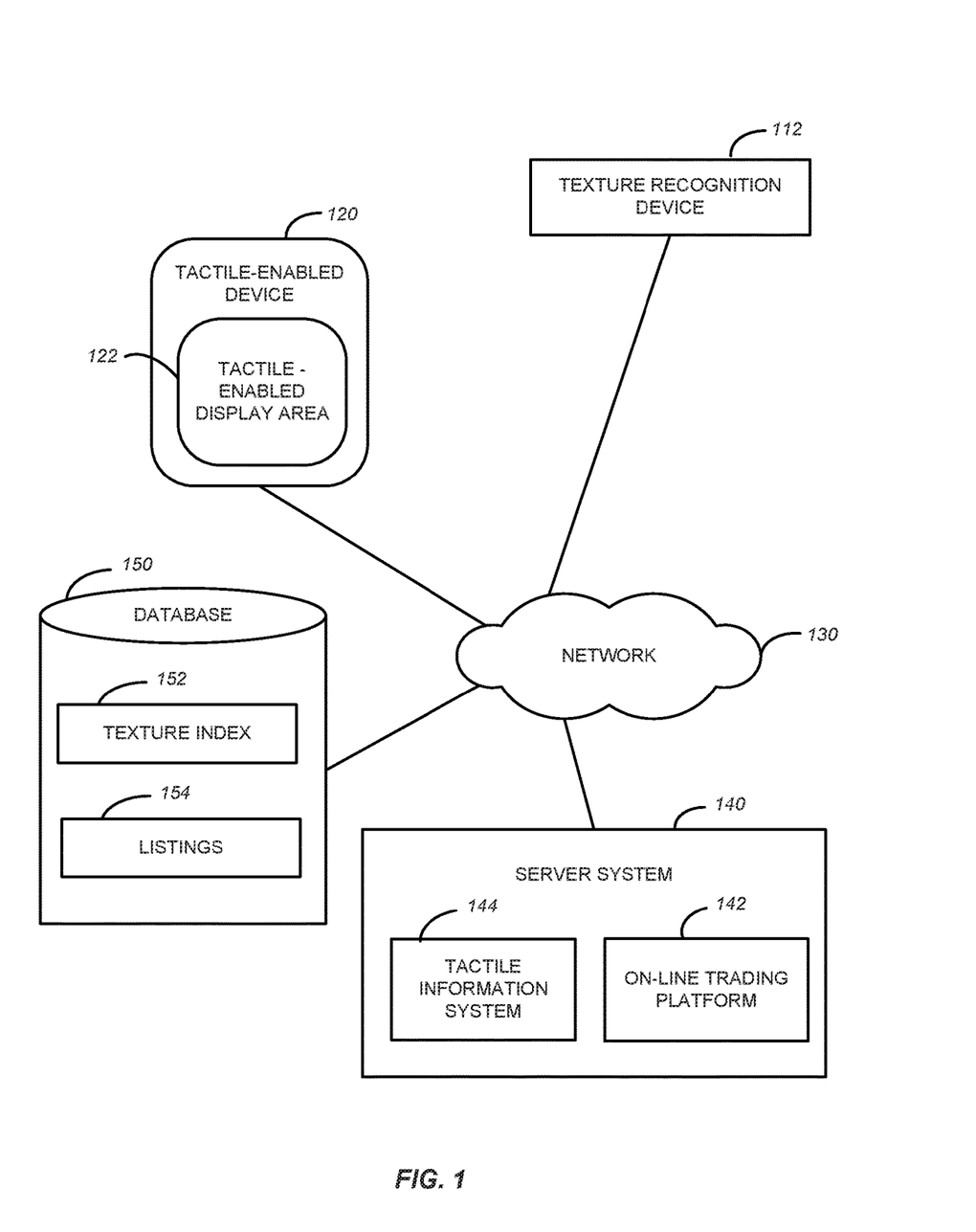
FIG. 1 is a diagrammatic representation of a network environment within which example method and system for generating content that has a tactile dimension may be implemented.

As shown in FIG. 1, the network environment 100 may include a tactile-enabled device 120 and a server system 140. The tactile-enabled device is shown to be in communication with the server system 140 via a communications network 130. The communications network 130 may be a public network (e.g., the Internet, a mobile communication network, or any other network capable of communicating digital data). The server system 140, in one example embodiment, may host a tactile information system 144 that could be used to generate a texture index 152 and to generate tactile-enabled electronic content, as described above. Tactile-enabled content may be accessed on a tactile-enabled display area 122 of the tactile-enabled device 120. As mentioned above, when a tactile-enabled content item is displayed by the tactile enabled device 120, a user is provided with tactile experience with respect to the displayed content. For example, when a tactile-enabled content item that represents a denim jacket is displayed on the tactile-enabled display area 122 of the tactile-enabled device 120, the user may touch the tactile-enabled display area 122 and experience a sensation as if he is touching denim fabric.

The tactile information system 144 may be configured to generate the texture index 152 based on information collected by so-called texture recognition devices, such as, e.g., a texture-recognition device 112. As mentioned above, the texture index 152 may include entries generated based on a textual description of a material (such as, e.g., "silk" or "leather") or, e.g., based on information obtained by a texture-recognition electronic device. The texture-recognition electronic device 112 may be, e.g., a camera equipped with sensors that can, in addition to capturing of an image or a video of an object, produce measurements of wrinkles, roughness, smoothness, sheen, shine etc. These measurements may be then utilized by the tactile information system 144 to create entries in the texture index 152.

The server system 140, in one example embodiment, may also host an on-line trading platform 142. The on-line trading platform 142 hosted by the server system 140, in one example embodiment, provides a place for buyers and sellers to come together and trade almost anything. In the context of one example on-line trading platform, a seller lists an item—most anything from antiques to cars, books to sporting goods. The seller chooses to either accept only bids for the item (an auction-type listing) or to offer the so-called "Buy It Now" option, which allows buyers to purchase the item right away at a fixed price.

The tactile information system 144 may be utilized beneficially in the context of the on-line trading platform 142. For example, the tactile information system 144 may be used to enhance listings of items provided by the on-line trading platform 142 by adding to at least some listings a tactile dimension. In order to add a tactile dimension to a listing, the tactile information system 144 uses the texture index 152. For example, when a listing of an item provided by the on-line trading platform 142 includes a description or an attribute that is indicative of texture, such as, e.g., "denim" or "leather," the tactile information system 144 may search the texture index 152 based on the attribute that is indicative of texture, and, if an entry that corresponds to that attribute or description is found in the texture index 152, the tactile information system 144 includes texture data from the determined entry into the listing. The resulting version of the listing may be presented on the tactile-enabled device 120 in a manner that provides a user with tactile experience. In some embodiments, the tactile-enabled device 120 is a mobile device. A non-mobile computer system may also be tactile-enables, so that it can be used to present tactile-enabled content in a manner that provides a user with tactile experience. Another example of the use of the tactile information system 144 together with on-line trading platform 142 is when a user enters search terms related to texture and a search engine utilizes the texture index 152 to generate search results of listings that have the texture features matching the search terms entered by the user.

Also shown in FIG. 1 is a database 150 that may be used to store the texture index 152. The database 150 may also store listings 154, e.g., where the texture index 152 and the tactile information system 144 are used with the online trading platform 142. Example modules that may be included in tactile information system 144 are illustrated in FIG. 2.

Figure 2:
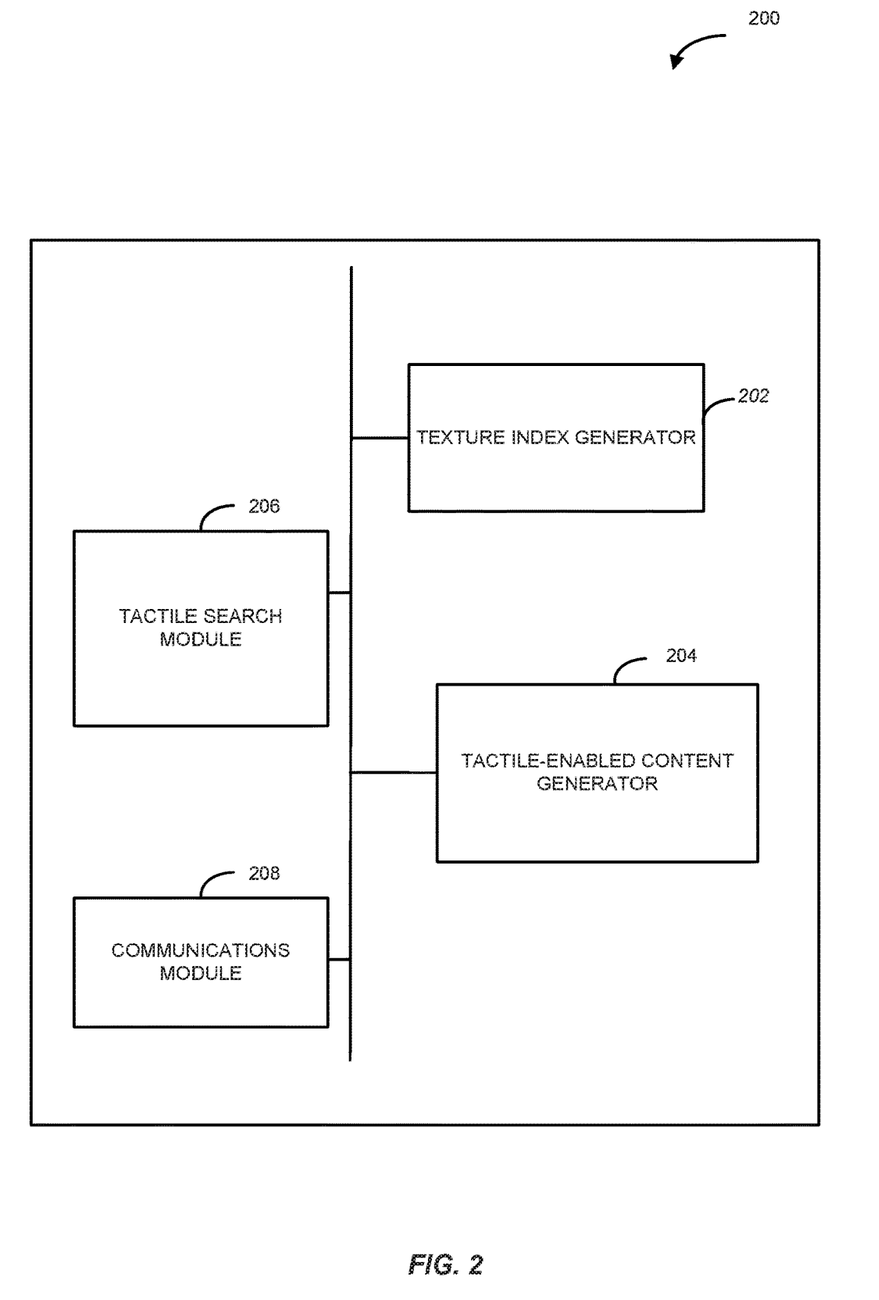
FIG. 2 is block diagram of a system for generating content that has a tactile dimension, in accordance with one example embodiment.

FIG. 2 is a block diagram of an example system 200 for generating and content that has a tactile dimension, in accordance with one example embodiment. As shown in FIG. 2, the system 200 includes a texture index generator 202 and a tactile-enabled content generator 204. The texture index generator 202 may be configured to generate a texture index (such as, e.g., the texture index 152 of FIG. 1). The texture index 152 comprises entries indicative of respective tactile information. The tactile-enabled content generator 204 may be configured to access a content item (e.g., a listing provided by the online trading platform 142 of FIG. 1) and to associate the content item with an entry from the texture index 152 to produce a tactile-enabled content item. For example, the tactile-enabled content generator 204 may be configured to access a content item that includes a representation of an object, determine that the object has a texture characteristic, determine an entry from the texture index 152, based on the texture characteristic of the object in order to generate a tactile-enabled version of the content item.

The system 200 may also include a tactile search module 206. The tactile search module 206 may be configured receive a search request directed to the online trading platform 142 and determine that the search request comprises a search term describing texture. The tactile search module 206 may then utilize the texture index 152 to generate one or more search results based on the search term describing texture. The one or more search results include one or more listings provided by the online trading platform 142.

The system 200 may also include a communications module 208. The communications module 208 may be configured to receive a request from the user directed to an on-line trading system (e.g., the on-line trading system 142 shown in FIG. 1), such as, e.g., a request to show listings of sale items that include certain tactile characteristics, such as, e.g., "leather," "denim," etc. The communications module 208 may also be configured to communicate tactile-enabled content items to the tactile-enabled device 120 of FIG. 2. Example operations performed by the system 200 can be described with reference to FIG. 3.

Figure 3:
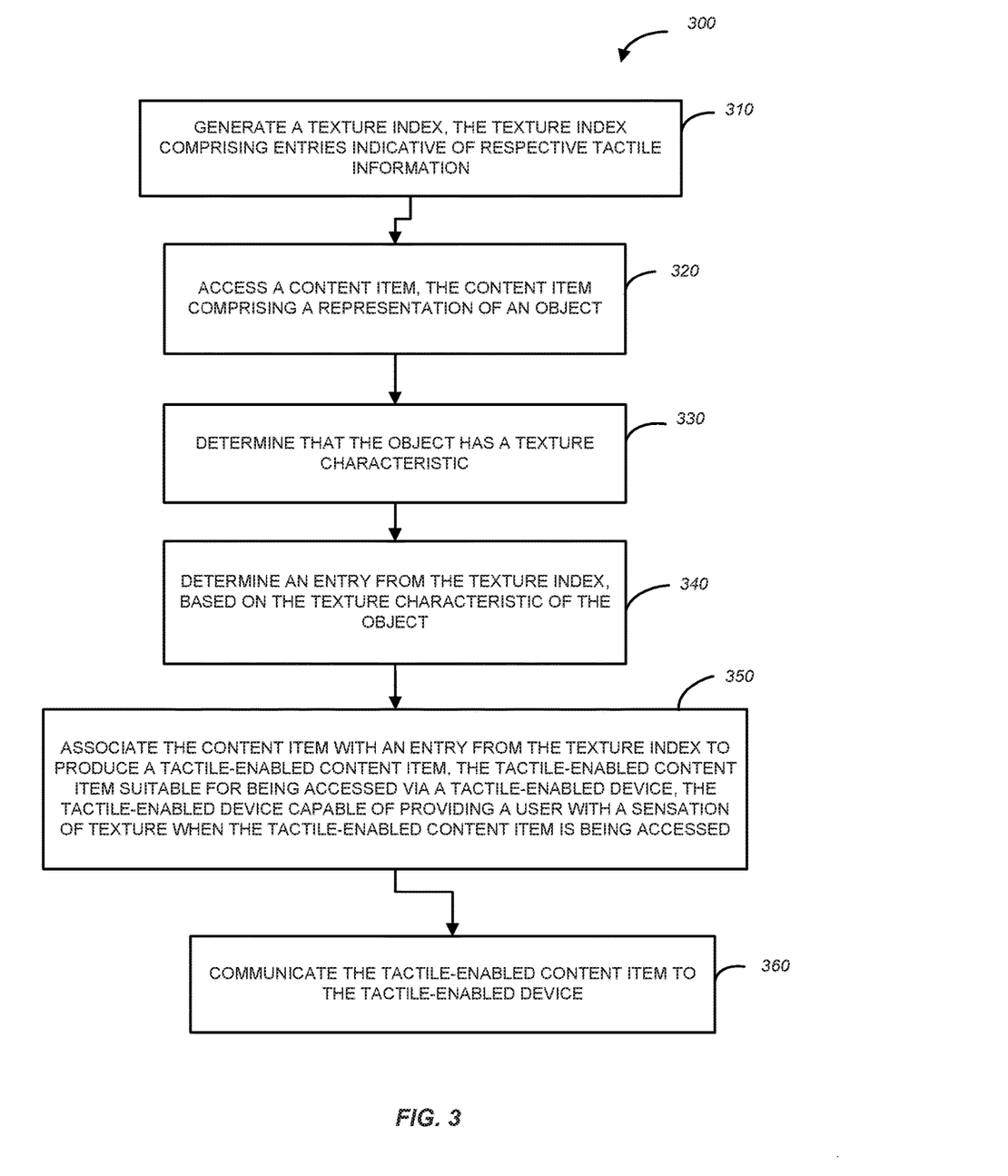
FIG. 3 is a flow chart of a method for generating content that has a tactile dimension, in accordance with an example embodiment.

FIG. 3 is a flow chart of a method 300 for generating content that has a tactile dimension, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, where the texture index generator 202 of FIG. 2 generates a texture index, the texture index comprising entries indicative of respective tactile information. At operation 320, the tactile-enabled content generator 204 of FIG. 2 accesses a content item that comprises a representation of an object and determines, at operation 330, that the object represented in the content item has a texture characteristic. At operation 340, the tactile-enabled content generator 204 determines an entry from the texture index 152 of FIG. 1 based on the texture characteristic of the object represented in the content item. At operation 350, the tactile-enabled content generator 204 associates the content item with an entry from the texture index to produce a tactile-enabled content item. As explained above, the tactile-enabled content item is suitable for being accessed via a tactile-enabled device, such as the tactile-enabled device 120 of FIG. 1. At operation 360, the communications module 208 of FIG. 2 communicates the tactile-enabled content item to the tactile-enabled device 120 of FIG. 1.

Figure 4:
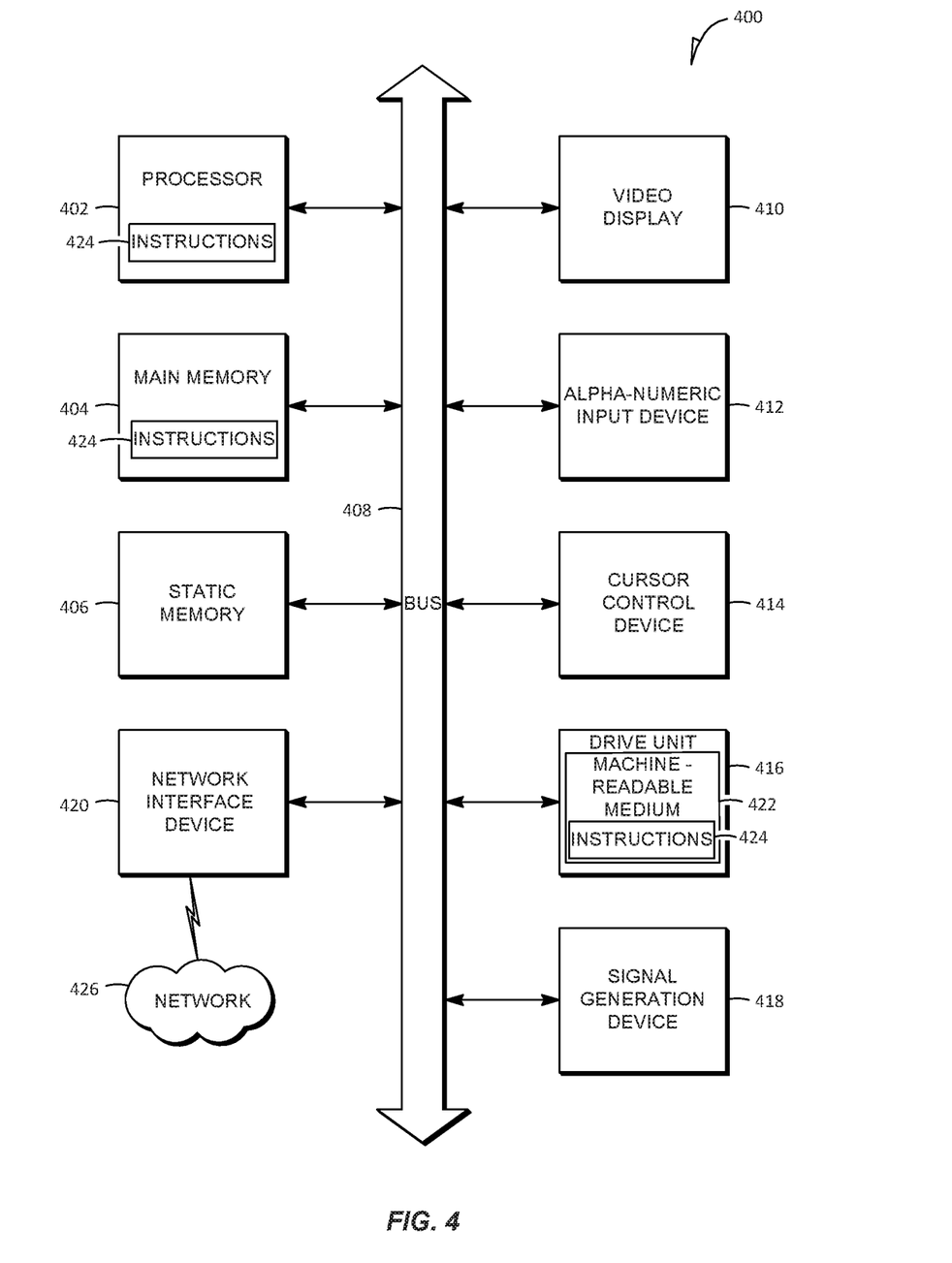
FIG. 4 is a diagrammatic representation of an example machine in the form of a computer system within which a set of instructions, for causing the machine to perform any one or more of the methodologies discussed herein, may be executed.

FIG. 4 shows a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system for generating and using a texture index has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A system comprising:
   one or more hardware processors; and
   a memory storing instructions that, when executed by the one or more hardware processors, causes the one or more hardware processors to perform operations comprising:
   generating a tactile-enabled content item by applying a texture attribute to a content item, the tactile-enabled content item enabling a tactile function to provide a sensation of texture on a tactile-enabled device;
   receiving a search term describing the texture attribute;
   generating a search result based on the search term, the search result including the tactile-enabled content item; and
   transmitting instructions to cause a device to generate a user interface that is configured to display the tactile-enabled content item and provide the tactile function.

2. The system of claim 1, wherein the operations further comprise generating and storing a texture index, the texture index comprising entries indicative of respective tactile information, wherein one of the entries includes the texture attribute.

3. The system of claim 2, wherein the generating of the texture index comprises generating an entry for the texture index based on a textual description of a material.

4. The system of claim 2, wherein the generating of the texture index comprises generating an entry for the texture index based on data obtained by a texture-recognition device.

5. The system of claim 4, wherein the texture-recognition device comprises one or more sensors to produce one or more measurements associated with an image, the one or more measurement being used to generate the entry for the texture index.

6. The system of claim 5, wherein the one or more measurements comprise measurements of wrinkles, roughness, smoothness, sheen, or shine.

7. The system of claim 1, wherein the operations further comprise:
   accessing the content item, the content item comprising a representation of an object;
   determining that a description of the content item includes the texture attribute; and
   identifying an entry from a texture index based on the texture attribute, wherein the generating the tactile-enabled content item is in response to identifying the entry.

8. The system of claim 1, wherein the generating the tactile-enabled content item comprises associating the content item with an entry from a texture index to produce the tactile-enabled content item.

9. A method comprising:
   generating, using at least one processor, a tactile-enabled content item by applying a texture attribute to a content item, the tactile-enabled content item enabling a tactile function to provide a sensation of texture on a tactile-enabled device;
   receiving a search term describing the texture attribute;
   generating a search result based on the search term, the search result including the tactile-enabled content item; and
   transmitting instructions to cause a device to generate a user interface that is configured to display the tactile-enabled content item and provide the tactile function.

10. The method of claim 9, further comprising generating and storing a texture index, the texture index comprising entries indicative of respective tactile information, wherein one of the entries includes the texture attribute.

11. The method of claim 10, wherein the generating of the texture index comprises generating an entry for the texture index based on a textual description of a material.

12. The method of claim 10, wherein the generating of the texture index comprises generating an entry for the texture index based on data obtained by a texture-recognition device.

13. The method of claim 12, wherein the texture-recognition device comprises one or more sensors to produce one or more measurements associated with an image, the one or more measurement being used to generate the entry for the texture index.

14. The method of claim 13, wherein the one or more measurements comprise measurements of wrinkles, roughness, smoothness, sheen, or shine.

15. The method of claim 9, further comprising:
   accessing the content item, the content item comprising a representation of an object;
   determining that a description of the content item includes the texture attribute; and
   identifying an entry from a texture index based on the texture attribute, wherein the generating the tactile-enabled content item is in response to identifying the entry.

16. The method of claim 9, wherein the generating the tactile-enabled content item comprises associating the content item with an entry from a texture index to produce the tactile-enabled content item.

17. A hardware storage device storing instructions that, when executed by one or more processors of a machine, cause the machine to perform operations comprising:
   generating a tactile-enabled content item by applying a texture attribute to a content item, the tactile-enabled content item enabling a tactile function to provide a sensation of texture on a tactile-enabled device;
   receiving a search term describing the texture attribute;
   generating a search result based on the search term, the search result including the tactile-enabled content item; and
   transmitting instructions to cause a device to generate a user interface that is configured to display the tactile-enabled content item and provide the tactile function.

18. The hardware storage device of claim 17, wherein the operations further comprise generating and storing a texture index, the texture index comprising entries indicative of respective tactile information, wherein one of the entries includes the texture attribute.

19. The hardware storage device of claim 17, wherein the operations further comprise:
   accessing the content item, the content item comprising a representation of an object;
   determining that a description of the content item includes the texture attribute; and
   identifying an entry from a texture index based on the texture attribute, wherein the generating the tactile-enabled content item is in response to identifying the entry.

20. The hardware storage device of claim 17, wherein the generating the tactile-enabled content item comprises associating the content item with an entry from a texture index to produce the tactile-enabled content item.

* * * * *

UNITED STATES PATENT AND TRADEMARK OFFICE
CERTIFICATE OF CORRECTION

PATENT NO. : 10,402,885 B2
APPLICATION NO. : 15/609930
DATED : September 3, 2019
INVENTOR(S) : Neelakantan Sundaresan et al.

It is certified that error appears in the above-identified patent and that said Letters Patent is hereby corrected as shown below:

On the Title Page

In item (56), in Column 2, under "Other Publications", Line 1, delete "13/863,191," and insert -- 13/861,191, --, therefor.

Signed and Sealed this
Eighth Day of September, 2020

Andrei Iancu
*Director of the United States Patent and Trademark Office*